June 27, 1950 T. A. BENNER 2,512,994

VOLUME CONTROL FOR AMPLIFIERS

Filed March 29, 1946 2 Sheets-Sheet 1

INVENTOR:
T. A. BENNER
BY [signature] ATTY.

June 27, 1950 T. A. BENNER 2,512,994

VOLUME CONTROL FOR AMPLIFIERS

Filed March 29, 1946 2 Sheets-Sheet 2

INVENTOR:
T. A. BENNER
BY [signature] ATTY.

UNITED STATES PATENT OFFICE 2,512,994

VOLUME CONTROL FOR AMPLIFIERS

Theodore A. Benner, New York, N. Y., assignor to Airplane & Marine Instruments, Inc., New York, N. Y., a corporation of New York Application March 29, 1946, Serial No. 658,033

2 Claims. (Cl. 179—171)

This invention relates to a control transmission system wherein there is employed a repeater unit device for automatically strengthening when necessary, and maintaining, the line voltage to field stations where the controls are to be received, the invention having for example to provide a construction which is more efficient in operation and less costly to install and maintain than those heretofore proposed.

With these and other objects in view the invention resides in the novel details of construction and combinations of parts as will be disclosed more fully hereinafter and particularly covered by the claims.

Referring to the accompanying drawings forming a part of this specification and in which like numerals designate like parts in all the views, Fig. 1 is a representative wiring diagram of a control system in which this invention is employed;

In order that this invention may be better understood it is said that frequently the transmission of line voltages is impaired due to varying conditions such as formation of ice on the line wires, to the end that there is a material loss of the line voltage, often sufficient to cause a non-performance of some mechanism at a field station which, particularly in railway signal and control transmission, would be very serious since it might cause accidents and/or loss of life, though it is a fact that in recent years railway control systems have been designed so that any failure and/or non-performance would give a danger signal and hence such failure would be on the side of safety. Hence, by this invention a repeater unit is inserted in the system in order to boost when necessary and automatically maintain the line voltages for signal operations to a degree at least sufficient to permit the usual and intended signal and/or control to be transmitted to the desired field station and to operate the mechanism thereat.

Figures 1, 2, 3:
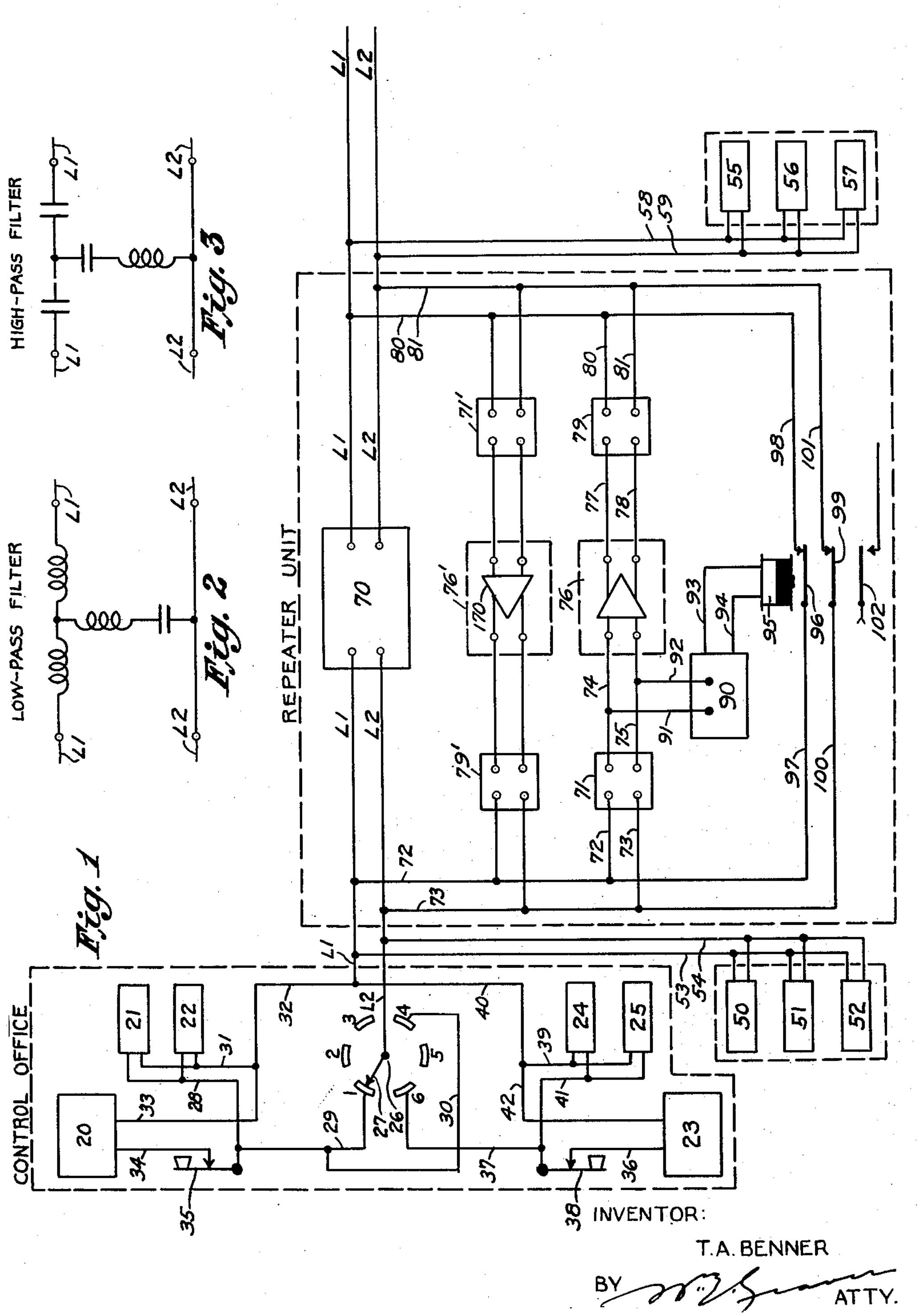
Fig. 2 is a wiring diagram of a low-pass filter hook-up as used in the system.
Fig. 3 is a wiring diagram of a high-pass filter hook-up as used in the system.

More specifically the system as illustrated in Fig. 1 comprises a control office at which there is located a plurality of electronic transmitters for sending the controls out over line wires such as L1 and L2 to the plurality of field stations at which the controls are to be effective. Said transmitters are preferebly arranged in groups or sets, one group associated with electronic control receivers at one geographic section or location in the system, and another group of transmitters associated wtih other electronic receivers at a different geographic location in the system.

A commutator device is also provided at the control office for governing the transmission, at successive intervals, of the frequencies generated by the transmitters, said commutator device having preferably a member movable over fixed contacts by which the successive transmission is accomplished. The transmitters of a group are adapted to create currents of different frequencies, a frequency for each of the transmitters of the group, and the transmitters of each of the other groups also have the ability to provide different frequencies, but the transmitters and the frequencies thereof in any one group may be duplicated by and in the transmitters of each of the other groups there being illustrated, merely for simplicity of understanding, two groups of such transmitters in Fig. 1. Also it should be stated that the feature of station selection is accomplished by using different frequency pulsing rates for each geographic group of receivers.

Hence, at the control office there is provided a plurality of electronic transmitters identified as 20, 21 and 22 constituting one group, and another group of electronic transmitters 23, 24 and 25, the transmitters of the second group being duplicates respectively of the transmitters of said first named group. However, the output frequency of transmitter 20 is different from that of transmitter 21, and the output frequency of transmitter 22 is different from that of 20 and 21; and similarly the output frequencies of transmitters 23, 24 and 25 differ from each other but are respectively the same as the frequencies of transmitters 20, 21 and 22. Each of these transmitters is substantially the same as the electronic transmitter particularly illustrated and described in a co-pending application for patent by Harry W. Richards, filed November 2, 1945 under the Serial No. 626,343, now abandoned.

The commutator device as shown comprises a shaft 26 to which is given a substantially constant speed of rotation, and upon said shaft for rotation therewith is mounted an arm 27 the free end of which successively engages a series of contacts identified by the numerals from 1 to 6, said contacts being circularly arranged in this design, and spaced from each other, and having relatively fixed relation with respect to the rotating arm. One terminal of transmitter 21 is connected as by the wires 28 and 29 to contact 1 with a branch 30 leading to contact 4, one of the terminals of transmitter 22 being in parallel relation with the wire 28. The other terminals of transmitters 21 and 22 are connected in parallel relation with the wires 31 and 32 to the line wire L1, and the rotating arm 27 is directly connected to line wire L2. Transmitter 20 has one of its terminals connected as by the wire 33 to wire 32, and the other terminal connected as by the wire 34 to wire 29 with a manual test switch, generally identified by the numeral 35, in the wire connection 34.

In similar manner transmitter 23 has one terminal connected as by the wires 36 and 37 to the commutator contact numbered 6, with a duplicate manual test switch 38 inserted in the wire connection 36; and the transmitters 24 and 25 have one terminal of each connected in parallel to line wire L1 as by the wires 39 and 40, the other terminals of these transmitters being parallelly connected as by the wire 41 to wire 37; and lastly the other terminal of transmitter 23 is connected as by the wire 42 to wire 40. Therefore, it will be evident from these connections that the output of the transmitters are successively impressed upon the line wires by virtue of the engagement of the rotating arm 27 with the contact members of the commutator device which are connected to said transmitters.

If for example said arm is rotating at a speed of 500 R. P. M., then there will be 500 pulsations per minute of these frequencies impressed on the line, but if and when a greater number of pulsations is required at the same speed of rotation of the arm, then additional contact members are connected to those transmitters whose frequencies are to have their rate of pulsations increased wherefore, as an illustration, the wire 30 has been shown connected to contact member 4 so that the frequency of pulsation of transmitters 20, 21 and 22 is doubled.

In the field there is provided one group of electronic receivers 50, 51 and 52 which are connected in parallel as by wires 53 and 54 to line wires L1 and L2, and at a different geographic location there is provided another group of similar receivers 55, 56 and 57 connected to said line wires as by the wires 58 and 59. These receivers are substantial duplicates of the electronic receiver particularly illustrated and described in the co-pending application of Harry W. Richards filed November 2, 1945 under the Serial No. 626,-343. The one group comprising receivers 50, 51 and 52 are controlled by the group of transmitters 20, 21 and 22 at the control office, and the other group of receivers is controlled by the other group of transmitters at said office.

Fundamentally the similar receivers 50 and 55 are tuned to be responsive to the high frequency output of transmitters 20 and 23, and the similar receivers 51 and 56 are tuned to be responsive to the high frequency output of transmitters 21 and 24, and the similar receivers 52 and 57 are tuned to be responsive to the high frequency output of transmitters 22 and 25. However, the rate of pulsation of the emanated frequencies is a determining factor in the selection of the transmitted control by the one or the other group of receivers. That is to say, for example, if the rate of pulsation is 500 then the receivers 55, 56 and 57 only will respond to the transmitted control, but if the rate of pulsation is 1,000 then the receivers 50, 51 and 52 only will respond to the transmitted control. Thus it will be seen that the commutator device constitutes a means for selecting the particular group of receivers to be actuated at the desired geographic field locations, as well as constitutes a means for impressing the control frequencies on the line.

At some point in the line, as found necessary, a repeater unit is inserted for the purpose of strengthening the level of the electrical energy utilized by the controls to the exclusion of other energies which may be present on the line by virtue of the line wires (according to this invention) being any existing wires and which therefore may be in use for transmitting other utilities. That is to say, it is to be understood that any existing line wires may be used for this system of control transmission, such as telephone and/or power lines, to the end that this control system makes unnecessary the expense of an additional pole line facility. It will be further understood that the frequencies contemplated according to this invention are those which are well above the audible range.

Referring to Fig. 1, the repeater unit is shown in general diagram as comprising a low-pass filter 70 which is inserted directly in the line, that is to say a filter which is adapted to pass frequencies which are below 175 kc. for example, said filter being of a standard type and having its arrangement of inductances and capacities substantially as shown in Fig. 2.

The repeater unit provides plural paths for the transmission of signal and/or control frequencies therethrough, one path being normal and used when there has been substantially no abnormal line loss, and another path being utilized in which a weakened received signal is amplified and returned to the line in strengthened condition to be effectively received by receivers therebeyond. By use of the low-pass filter 70, there can be no feed back of the amplified signal to the input side of the repeater unit, since said filter serves to block all frequencies above substantially 175 kc.

Figure 4:
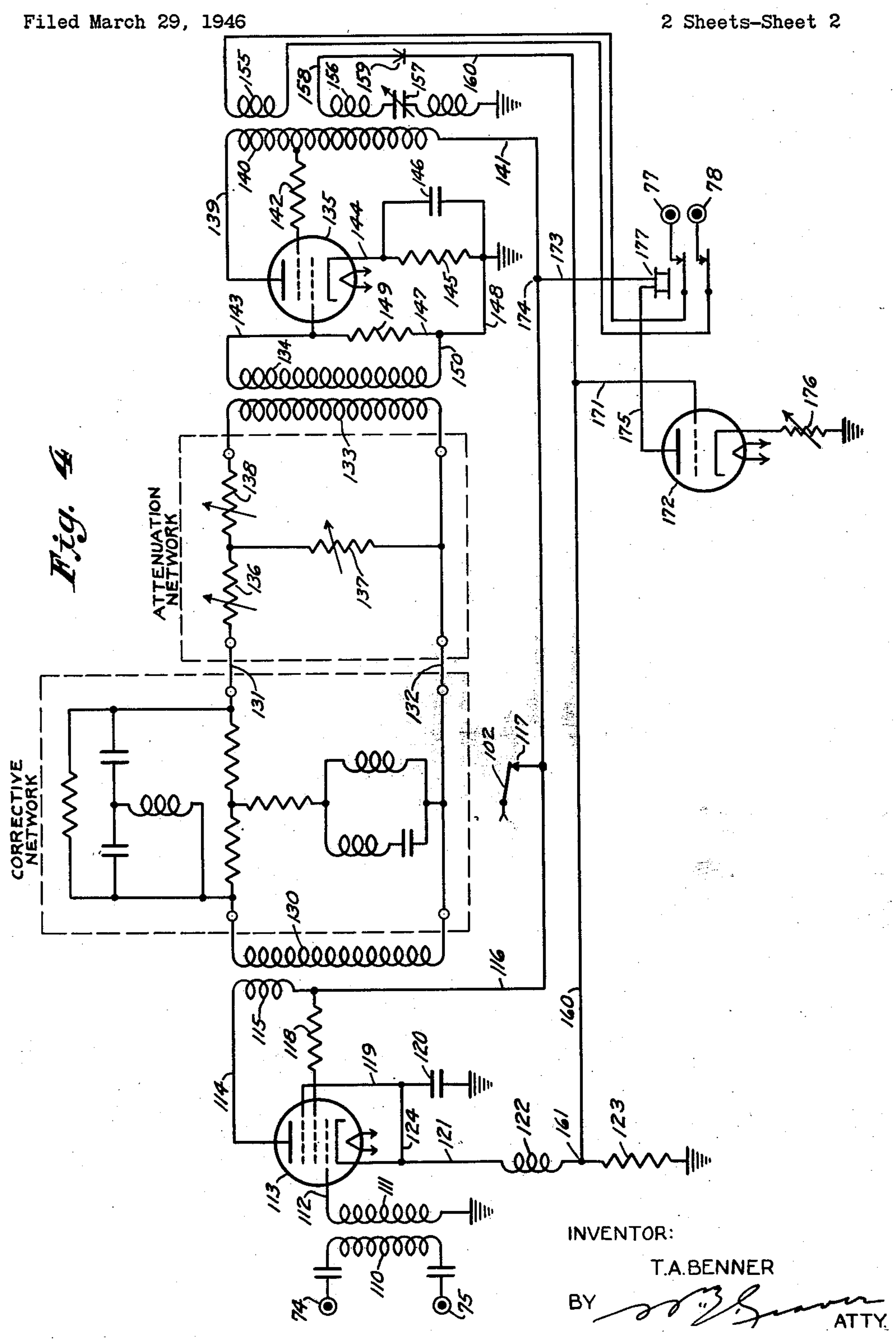
Fig. 4 is a wiring diagram of the repeater unit.

Also, there is provided a high-pass filter 71 of a standard type, the inductances and capacities of which may be according to the showing in the diagram of Fig. 3, said filter on one side being connected as by the wires 72 and 73 to the line wires L1 and L2 leading into the repeater unit, the other side of said filter being connected as by the wires 74 and 75 to the input side of an amplifier generally designated by the numeral 76 and illustrated in detail in Fig. 4. The opposite side of said amplifier is connected as by the wires 77 and 78 to one side of a duplicate high-pass filter identified at 79, the other side of said filter being connected as by the wires 80 and 81 to the line wires L1 and L2 leading away from the repeater unit.

An electronic receiver 90 is provided, connected on one side as by the wires 91 and 92 to wires 74 and 75 respectively, and connected on another side as by the wires 93 and 94 to a slow-release relay 95 having triple interconnected and pivoted armatures for movement in unison as indicated. The armature 96 is connected through its pivot and wire 97 to wire 72, said armature when attracted by said relay closing with its front contact which is connected by wire 98 to wire 80. In similar manner armature 99 is connected through its pivot and wire 100 to wire 73, and when attracted by said relay closing with its front contact which is connected by wire 101 to wire 81. The third armature 102 serves as a switch in the amplifier operating battery supply circuit. The receiver 90 is tuned to be responsive solely to the high frequency of transmitters 20 and 23 at the control office.

By this construction it will be understood that under all conditions all of the impressed frequencies will be received from the line, pass into and through the repeater unit, and back to the line. If the impressed frequencies be received in their normal strength, they will pass unaffected through said repeater, said frequencies taking the path comprising wires 72—73, 97—100, 98—101, and 80—81; and simultaneously the frequency of transmitters 20 and 23 will pass by wires 72—73 and 91—92 to receiver 90 thereby causing energization of the magnet of relay 95 to attract its plural armatures and thus maintain continuity of circuit through armatures 96 and 99 and causing the battery circuit of the amplifier to be opened by armature 102. Whereas, under these conditions, all the control frequencies may reach amplifier 76 over wires 74 and 75, yet the amplifier will not be affected due to the open condition of the battery circuit operating the same.

As hereinbefore stated the receiver 90 is tuned for response solely to the high frequency of control office transmitters 20 and 23, but it is believed that further statements should be given with respect to the functioning of said receiver. This receiver may be a duplicate of that illustrated in Fig. 4 of the aforementioned Harry W. Richards application for Patent Serial No. 626,343 with the exception that, instead of the Richards relay shown associated therewith, there is now contemplated a slow release relay 95. The reason for this is to permit the armatures of said relay to remain closed during the time intervals (respective the commutator device) between the effective impressions of the operating frequencies on the line which are in accordance with the responsiveness of receiver 90. In other words, the release time for the relay 95 is greater than any possible time interval during which the rotating arm 27 in any one revolution may not connect the operating frequency for receiver 90 to the line.

The receiver 90 and its associated relay 95 are so adjusted as to cause operation of the relay at a definite predetermined signal strength as measured at the input terminals of the repeater. In other words, said relay will be energized at and above said predetermined strength to cause straight-through transmission of the frequencies by virtue of wires 97—100 and 98—101, but when the signals are below said predetermined strength then said relay will become deenergized and all of its armatures will drop to break said straight-through path and to close (through armature 102) the battery circuit for the amplifier, whereupon the amplifier will function to reestablish the predetermined strength in a manner as will be disclosed later.

Coming now to Fig. 4 there is illustrated therein the wiring of the amplifier generally identified by the numeral 76. The input side of said amplifier comprises the terminals for wires 74 and 75, which terminals are connected to opposite ends of the primary 110 of a transformer, with suitable blocking condensers as shown, the secondary 111 of said transformer having one end thereof connected to chassis ground, and the other end connected as by the wire 112 to the control grid of a suitable input voltage amplifying tube generally identified by the numeral 113. The plate of said tube is connected by the wire 114 to the primary 115 of a coupling transformer, which primary is connected by wire 116 to the back contact 117 in the battery supply circuit controlled by armature 102 of relay 95 heretofore described, said armature being connected to battery as indicated.

The resistor 118 connects wire 116 with the screen of said tube in order to supply operating current from the battery to the tube screen. The suppressor grid of said tube is connected by wire 119 to chassis ground through a by-pass condenser 120. The cathode of said tube is connected by wire 121 to chassis ground through an inserted inductance 122 and the biasing resistor 123, and said wire 121 is connected by wire 124 to wire 119 to hold the cathode and the supressor grid at the same potential as well as to furnish a high frequency by-pass to chassis ground.

The secondary 130 associated with primary 115 is connected at its ends to the terminals on one side of a corrective network, the terminals on the opposite side thereof being connected as by the wires 131 and 132 to the terminals on one side of an attenuation network, the opposite terminals of which are connected to ends of the primary 133 of a transformer whose secondary 134 has one end thereof connected to the grid of the output tube 135 as by the wire 143. The corrective network may be of standard design as indicated, having components which may be varied in order to compensate for differences in line attenuation for various frequencies employed in the control system, thereby correcting inequalities in the strength of the signal received by this amplifying unit.

The attenuation network may also be of standard construction but provided with means for manual adjustment whereby the variable resistors such as 136, 137 and 138 will be actuated in unison by a single dial to regulate the desired level of output at terminals 77 and 78 for conditions considered normal.

The plate of the output tube 135 is connected by the wire 139 to one end of the primary 140 of the output transformer, the other end of said primary being connected as by the wire 141 to the back contact 117 heretofore described. Said primary 140 has a tap leading to the screen of said tube and having a resistor 142 therein. The cathode of said tube is connected as by the wire 144 to chassis ground through the resistor 145 and also through a by-pass condenser 146. The grid of said tube is also connected to chassis ground as by the wires 147 and 148, the former having the resistor 149 therein, and the other end of the secondary 134 is connected as by the wire 150 to wire 147.

The primary 140 of the output transformer has a secondary 155 the ends of which are connected through suitable terminals to wires 77 and 78 heretofore described, the circuit being controlled through the front contacts of a relay 177. Said primary also has another secondary such as 156 having a variable condenser 157 inserted at its center tap, one end of said secondary 156 going to chassis ground and the other end connected by wire 158 to a uni-directional current flow device such as selenium rectifier indicated at 159, from which wire 160 leads to a junction 161 between the inductor 122 and resistor 123. A branch of wire 160 is connected as by the wire 171 to the grid of a control tube 172.

Thus it will be seen that the output transformer comprising primary 140 and its secondary 155 constitutes the means for feeding the amplified signal to the line wires, and that the primary 140 and its other secondary 156, together with the variable condenser 157 and rectifier 159, in combination with resistor 123, inductor 122 and condenser 120, constitutes an automatic gain regulation circuit for maintaining a predetermined range of levels for the output signal, as measured across the wires 77—78, in accordance with the adjustment initially set up between the corrective and attenuation networks to satisfy operating conditions.

The predetermined range of output levels thus established includes the desired level for which the attenuation network was adjusted, and further said predetermined range is solely in accordance with a particular and safe-operating range of energy levels received at the input stage of this amplifier unit or repeater. That is to say, it is intended to have this amplifier operate effectively only on variations of input energy which are to be expected because of changes in weather conditions, wherefore when abnormal and/or fault conditions affect the input energy beyond a safety factor, the amplifier will be ineffective, due to the incorporation therein of any suitable mechanism such as a relay 177 which will open the amplifying circuit, but which will close the circuit after the fault condition has passed. The relay 177 is energized by current supplied to one side of its coil as by the wire 173 connected with wire 141 at the junction point 174, the other side of the relay coil being connected as by the wire 175 to the plate of the control tube 172. Tube 172 is biased through the variable resistor 176 which is so adjusted that the relay will become deenergized when the signal output across the wires 77 and 78 falls below a predetermined level, due to said abnormal and/or fault conditions.

Further, the circuit comprising primary 140 and its secondary 156 is tuned by the variable condenser 157 to be responsive solely to the frequency which effectively actuates receiver 90. Still further, the regulating feature developed by this circuit makes use of the automatic biasing of the input tube, because of the different voltages induced on the secondary winding 156, which voltages cause varying direct currents to flow through resistor 123 thereby varying the cathode voltage of input tube 113 with respect to ground, and this variance in turn regulates the gain of the input stage. The purpose of inductor 122 in combination with the condenser 120, is to cause a smoother action in the above mentioned regulation when a pulsing signal such as described heretofore is received by the amplifier.

It will be understood that all of the structural features of the amplifier must be coordinated and, using the resonant frequency to which the automatic gain control circuit is tuned as a reference point, the design and regulation of the corrective and attenuation networks must be built around and adjusted thereto in accordance with the local operating conditions. Further, the intent of the invention is to provide a device that will operate without an attendant, on the side of safety, and with a minimum of maintenance including adjustments, since the initial adjustment is made to meet the maximum expected variations of line loss.

When the conditions, which cause abnormal loss, are remedied and the received signal at the repeater input terminals is again of normal strength, then receiver 90 will cause its relay 95 to become energized and attract its armatures, whereby armatures 96 and 99 will connect the wires 97—100 with the wires 98—101 to reestablish the straight-through path for the received signal, and simultaneously through armature 102 will open the battery circuit to render amplifier 76 inoperative.

The foregoing description has been with respect to transmission of signals and/or controls in one direction only in the system, namely, from left to right as seen in Fig. 1. It may however be desirable in some systems to provide for a transmission of signals, indications, and/or controls from the field back to the control office, or in a direction reverse to that previously considered. In such a case there will be electronic transmitters at field locations, which transmitters will be connected in multiple with the field receivers now shown in Fig. 1, and there will be electronic receivers at the control office, which receivers will be connected in multiple with the control office transmitters now shown in said figure, the operation of which newly considered transmitters and receivers will be the same except that their control energy will have reverse flow. However, it will be realized that frequencies employed for such reverse transmission must be in a band which is different from the band utilized for the opposite transmission.

Therefore, in Fig. 1 there has been indicated a third transmission path in a repeater unit, which is a substantial duplicate of the path comprising filters 71 and 79 and amplifier 76, said duplications indicated by the numerals 71', 79' and 76', the amplifier 76' carrying the arrow symbol 170 to indicate the directional flow in reverse of frequencies in this path, which arrow symbol is reversed with respect to that shown in the path associated with amplifier 76. Possibly it would be desirable to provide, in this third and reverse path, band-pass filters of conventional design in place of filters 71' and 79', and it would be optional to use a receiver and associated relay such as 90 and 95 in conjunction with this third and reverse path.

In the appended claims the term "signals" is to be understood as definitive of any utility that may be transmitted by the use of different frequencies impressed upon line wires, and hence this invention is to cover controls, indications, or any other audibly and/or mechanically operated utilities or devices, and not to be limited specifically to signals alone. Further, this invention is applicable to the amplification of any transmitted current frequency for any purpose, and hence is not to be limited to the application thereof to railway systems alone.

It is obvious that those skilled in the art may vary the details of construction and arrangements of parts without departing from the spirit of this invention, wherefore it is desired not to be limited to the exact foregoing disclosure except as may be required by the claims.

What is claimed is:

1. An electronic amplifying unit for a system of signal transmission wherein different signal operating frequencies are impressed on and carried over line wires, and wherein a desired predetermined range of energy output for a signal is established, said unit comprising an input stage and an output stage, and a circuit including an automatic switching device as well as an electronic control therefor, said circuit for automatically regulating the output energy to within the established predetermined range, one portion of said circuit comprising a rectifier and a resistor connected serially to ground at one end thereof, said circuit portion having an interposed transformer secondary at the output stage tuned to be responsive to one of the signal operating frequencies and connected to ground at the other end of said portion, and another portion of said circuit connected in multiple with the resistor of said first named portion and comprising an inductor and a condenser connected serially to ground, said second named portion having a connection with the input stage intermediate said inductor and said condenser.

2. An electronic amplifying unit for a system of signal transmission wherein different signal operating frequencies are impressed on and carried over line wires, comprising an input stage and an output stage between which is disposed a network for correcting inequalities in the received signal strength, an attenuation network manually adjustable initially to establish the desired predetermined level of energy output for the signal, and a circuit including an automatic switching device as well as an electronic control therefor, said circuit for automatically regulating the output energy to within a predetermined ranges of levels, which range includes the desired level for which the attenuation network was adjusted, one portion of said circuit comprising a rectifier and a resistor connected serially to ground at one end thereof, said circuit portion having an interposed transformer secondary at the output stage tuned to be responsive to one of the signal operating frequencies and connected to ground at the other end of said portion, and another portion of said circuit connected in multiple with the resistor of said first named portion and comprising an inductor and a condenser connected serially to ground, said second named portion having a connection with the input stage intermediate said inductor and said condenser.

THEODORE A. BENNER.

REFERENCES CITED

The following references are of record in the file of this patent:

UNITED STATES PATENTS

| Number | Name | Date |
|---|---|---|
| 1,880,889 | Doba, Jr. | Oct. 4, 1932 |
| 2,031,539 | McCaa | Feb. 18, 1936 |
| 2,084,135 | Ford | June 15, 1937 |
| 2,137,020 | Luck | Nov. 15, 1938 |
| 2,154,062 | Chesnut | Apr. 11, 1939 |
| 2,325,829 | Boswau | Aug. 3, 1943 |
| 2,379,631 | Finckh | July 3, 1945 |